July 21, 1942.    A. H. HAWLEY, SR., ET AL    2,290,590
INDEXING MECHANISM
Filed July 31, 1939     3 Sheets-Sheet 1

INVENTOR.
Amos H. Hawley, Sr.
Winthrop Trible
BY
A. H. Parsons
ATTORNEY.

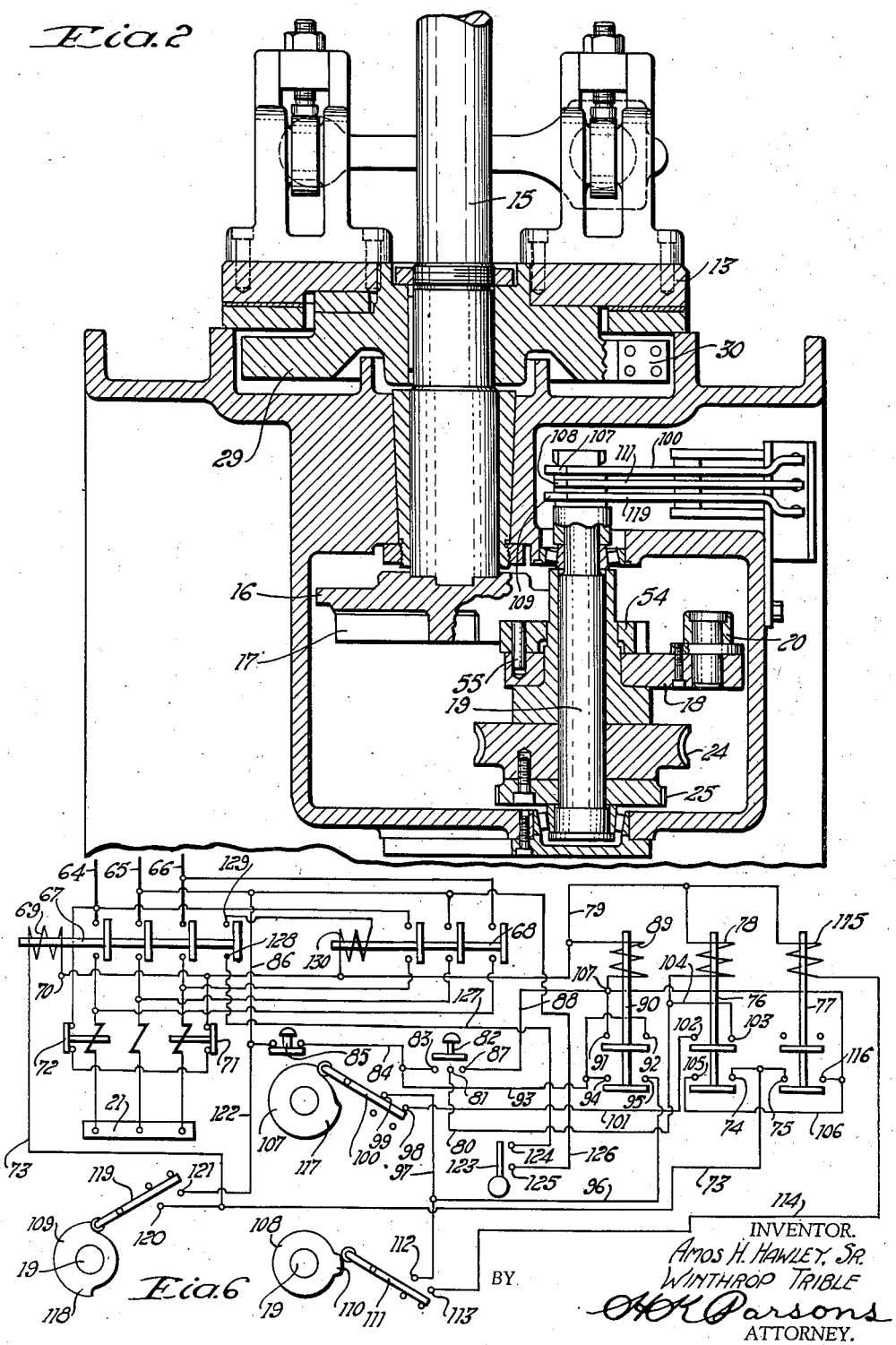

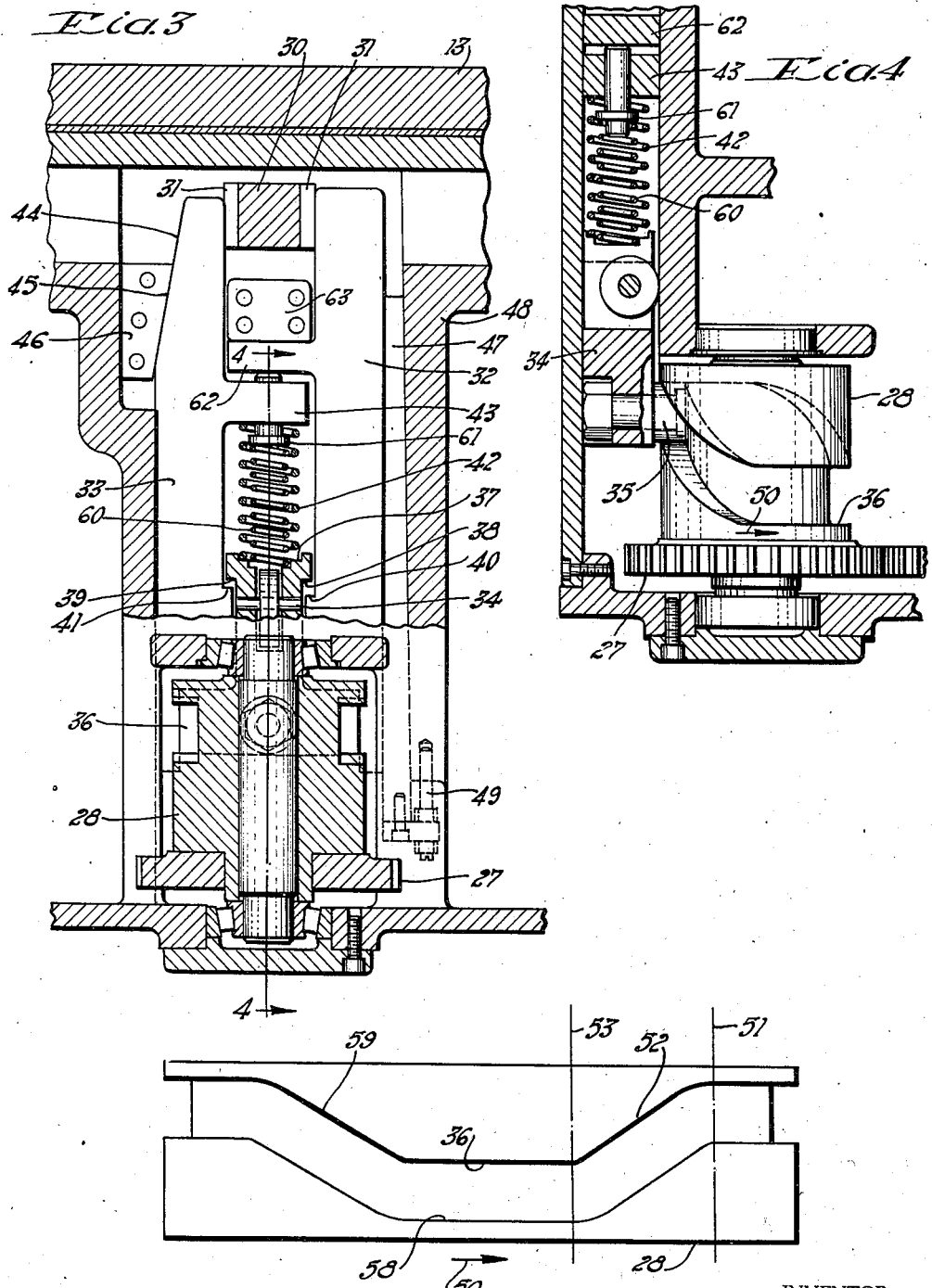

Patented July 21, 1942

2,290,590

UNITED STATES PATENT OFFICE 2,290,590

INDEXING MECHANISM

Amos H. Hawley, Sr., and Winthrop Trible, Cincinnati, Ohio, assignors to The Cincinnati Milling Machine Co., Cincinnati, Ohio, a corporation of Ohio Application July 31, 1939, Serial No. 287,512

10 Claims. (Cl. 90—56)

This invention relates to machine tools and more particularly to improvements in indexing mechanisms.

One of the objects of this invention is to contrive an indexing mechanism so that wear in the position determining means will be minimized.

Another object of this invention is to provide an indexing mechanism having improved automatic locking means.

A further object of this invention is to provide a complete power operated indexing unit for general use having its own prime mover and control circuit.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a section on the line 2—2 of Figure 1.

Figure 3 is a detail section on the line 3—3 of Figure 1.

Figure 4 is a section on the line 4—4 of Figure 3.

Figure 5 is an expanded view of the control cam for the locking mechanism.

Figure 6 is a diagrammatic view of the electrical control circuit.

Figure 1:
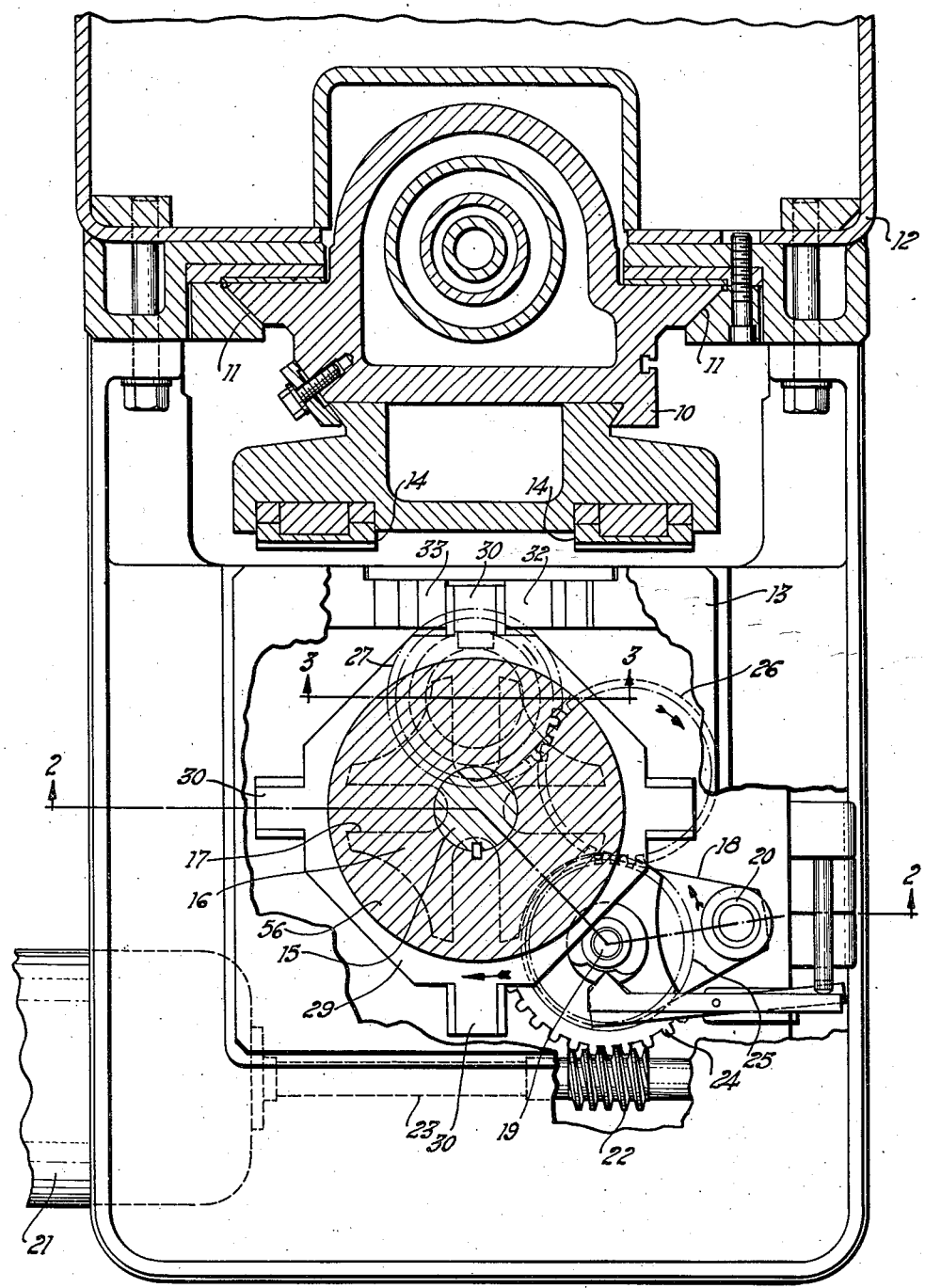
Figure 1 is a plan view partly in section and with other parts broken away of the indexing drive mechanism.

In Figure 1 of the drawings, the invention is exemplified in connection with a machine tool of the broaching type having a reciprocable broaching ram 10 movable in guideways 11 formed on a fixed part 12 of the machine, and the mechanism of this invention is utilized in this case for indexing a work supporting table 13 after each stroke of the broaching ram to move work into or out of the path of the broaching tools 14 carried by the ram 10. It is to be understood that suitable work holding fixtures may be applied to the surface of the table 13 for suitably holding the work during the machining operation.

The table 13 is secured to the upper end of a vertical shaft 15 and to the lower end of the shaft is secured a Geneva plate 16 having four radial slots 17. A Geneva crank arm 18 keyed to a vertical shaft 19, carries a roller 20, which, upon rotation of the shaft 19 is adapted to enter one of the radial slots and thereby effect rotation of the shaft 15 and table 13 through an angle of 90 degrees.

A prime mover 21 is provided for driving the shaft 19 through a worm 22 keyed to the motor shaft 23, and a worm wheel 24 keyed to the shaft 19.

The shaft 19 also carries a spur gear 25 for rotating through an idler gear 26, the spur gear 27 which is fixed to the locking assembly control cam 28 shown in Figures 3 and 4.

For the purpose of locating and locking the table 13 at its various stations, the table has a plate 29 secured to the underside thereof from the periphery of which extends four equally spaced locating bits 30. One of these bits is shown in Figure 3 and it will be noted that the sides of it are provided with hardened wear plates 31.

The locating and locking mechanism is adapted to cooperate with this bit for locating and locking the table. This mechanism comprises a locating plunger 32 and a locking plunger 33. These plungers are vertically shifted in predetermined sequence by an actuator 34 which carries a roller 35 riding in the groove 36 of the control cam 28. As shown in Figure 3 the actuator 34 has an enlarged head 37, thereby providing two shoulders 38 and 39. Cooperating shoulders 40 and 41 are formed on the plungers 32 and 33 respectively. Since the parts are shown in a table locking position in Figure 3, the manner of unlocking the table will be explained first.

Assuming the control cam 28 rotating in a direction to cause downward movement of the actuator 34, the first thing that happens is that the shoulder 39 engages the shoulder 41 of the locking plunger 33. An outer coil spring 42 is interposed between the end of the actuator 34 and a laterally projecting lug 43 on the locking plunger 33, and during movement of the actuator to take up the lost motion between the shoulders, this spring will merely expand due to the fact that the plunger 33 remains fixed in its locking position. The locking plunger has a beveled face 44 which engages the inclined face 45 of a fixed hardened block 46 which serves as a wedge to force the locking member against the bit 30, thereby clamping the bit against the locating plunger 32.

The locating plunger is held against lateral movement by the adjustable gib 47 which is interposed between the locating plunger and the fixed part 48 of the machine. The gib is vertically adjustable by a set screw 49 which serves to initially determine the position of the locating plunger.

It will thus be seen that the initial movement of the actuator 34 takes up the lost motion between the shoulders 39 and 41 and thereafter positively moves the locking plunger 33 downward.

After the locking plunger has been loosened the shoulder 38 engages the shoulder 40 and positively moves the locating plunger downward so that both plungers now move downward simultaneously to a point below the bit 30, thus clearing the bit and permitting the next indexing movement of the table to take place.

The worm 22 is uni-directionally driven by the prime mover 21 in such a direction as to rotate the worm wheel 24 and the Geneva crank arm 18 in a counterclockwise direction as viewed in Figure 1. This means that the idler gear 26 is rotated in a clockwise direction and the final gear 27 is rotated in a counterclockwise direction. This determines the direction of rotation of the cam 28 which is counterclockwise as indicated by the arrow 50 in Figures 4 and 5.

This drive mechanism is, in effect, a one revolution mechanism in the sense that the prime mover 21 rotates the shaft 19 through one revolution effecting in sequence unlocking of the table, indexing of the table, locking of the table, and then trips a control mechanism to stop the prime mover.

Control is also provided whereby the actual movement of the table from one station to the next may be an inching or jogging movement, that is, intermittently started and stopped at the will of the operator, but after the table has reached the next station, means are provided for taking the control away from the operator and automatically completing the revolution of shaft 19 to effect locking the table, which feature eliminates the possibility of the operator forgetting to lock the table after completion of an indexing movement. Thus, once the table has completed its movement to a new station it will be automatically locked at that station regardless of whether the movement to that station was by automatic cycle or by inching under the control of the operator.

The ordinate 51 in Figure 5 indicates the starting position of the roller 35 and corresponds to the starting position of the crank arm 18 indicated in Figure 1.

As the crank arm 18 rotates counterclockwise from its starting position the cam 28 simultaneously rotates in the direction of arrow 50 as indicated in Figure 5, and the inclined portion 52 of the cam track 36 between ordinate 51 and 53 effects downward movement of the roller 35 and thereby of the actuator 34 to effect unlocking of the table in the manner previously described. The unlocking of the table will be completed substantially at the same time that the roller 20 enters the radial slot 17 of the Geneva plate 16, and during the next 90 degrees of rotation of the shaft 19, the table will be rotated to its next station.

As is usual with such mechanisms, the shaft 19 carries a locking plate 54 which is integrally secured to the crank arm 18 as by a pin 55, Figure 2.

The periphery of this plate normally engages the surface of one of the arcuate depressions 56 in the periphery of the plate 16 preventing inadvertent rotation thereof until the roller 20 has entered a slot 17 at which time an arcuate depression 57 formed in the periphery of member 54 comes adjacent to the periphery of the plate 16 to provide clearance and permit movement of the plate.

The cam track 36 is provided with a straight portion 58 which serves to hold the plungers 32 and 33 in an unlocked condition during the indexing movement of the table. When this movement has been completed and the roller 20 starts to leave the slot 17, the cam track 36 is provided with an inclined portion 59 which becomes effective at this time to start the table locking operation. In other words, the two plungers 32 and 33 which are being held in engagement with the shoulders 38 and 39 of the actuator 34 by springs 42 and 60 respectively move simultaneously with the actuator.

The spring 60 is interposed between the head of the actuator and the end of a pin 61 which is freely guided in a hole formed in the lateral projection 43 of plunger 33. The upper end of plunger 61 engages the underside of a lateral projection 62 of plunger 32. It will be noted that the shoulder 40 on the plunger 32 is cut further from the end of plunger 32 than the shoulder 41 is cut with respect to the end of plunger 33. Thus, during this period of simultaneous upward movement the plunger 32 will be leading the end of plunger 33.

This has been provided so that the plunger 32 which is the locating plunger may get into position first and determine the location of the table and also provide the abutment against which the clamping plunger 33 is to lock or clamp the bit 30.

The simultaneous upward movement of both plungers continues until the lateral projection 62 of the locating plunger 32 engages the fixed stop plate 63. The shoulder 38 of the actuator 34 now moves away from the shoulder 40 and the locating plunger 32 is held in position by the spring 60. With the locating plunger 32 now in position, the actuator and plunger 33 continue moving to complete the locking operation.

The length of movement of the actuator 34 is made longer than the possible movement of the locking plunger so that after the locking resistance has stopped the movement of the plunger, the actuator will continue a sufficient distance to effect separation of the shoulders 39 and 41, thus permitting compression of the spring 42 and additional compression of the spring 60, whereby both plungers are held in locking position by the springs.

After the locking of the table has been completed the cam 28 completes its rotation to the starting position and this idling movement is utilized to operate certain controls to stop the prime mover and condition the control means for the next cycle of operation.

In Figure 6 there is shown a control circuit having means therein for initiating actuation of the prime mover, for stopping the prime mover automatically after one revolution of the mechanism, and for stopping the indexing portion of the cycle at will by the operator.

In this circuit the motor 21 is connectible to three power mains 64, 65 and 66 by a starting switch 67 for normal rotation of the motor, and by a reversing switch 68 for effecting reverse rotation of the motor, but the latter is only utilized herein for stopping purposes, as will be explained hereafter. The starting switch 67 has a starter coil 69, one end 70 of which is connected through thermal overload switches 71 and 72 to the power main 64, while the other end is connected by line 73 to contacts 74 and 75 of relays 76 and 77 respectively. Relay 76 has an operating coil 78 which has one end connected by line 79 and overload switches 71 and 72 directly to the power main 64, and the other end connected by line 80 to contact 81 of the starting button 82.

The starting button has another contact 83 which is connected by line 84, stop button 85, and line 86 to the power main 65. Thus, when the starting button is depressed interconnecting contacts 83 and 81, a circuit is completed from power main 65 through line 86, stop button 85, line 84, starting button 82, line 80, relay coil 78, line 79 and overload switches 71 and 72 to the power main 64. A parallel circuit is also completed by the starting button through interconnection of contact 83 with contact 87, current flowing from contact 87 through line 88 and relay coil 89 to line 79 which leads to power main 64. Thus, by depressing the starting button the relay coils 78 and 89 are simultaneously energized to effect actuation of the respective armatures 76 and 90.

Armature 90 closes contacts 91 and 92 to establish a holding circuit for the relay coil 89 through line 93, line 84, stop button 85 and line 86 to the power main 65, the other end of the coil being connected to the power main 64. In addition, the relay armature 90 closes contacts 94 and 95 to establish a circuit from line 93 through line 96, branch 97, closed contacts 98 and 99 of switch 100, and line 101 to contact 102 of relay 76. This makes it possible for the relay armature 76 to interconnect contact 102 with contact 103 and thereby establish a holding circuit for relay coil 78 through branch line 104.

In addition, the relay armature 76 interconnects contact 74 with contact 105, thereby closing a circuit from the starting switch coil 69 through line 73, interconnected contacts 74 and 105, line 106 to junction 107. When the starting button is closed the circuit is completed from junction 107 through line 88, the starting button 82, line 84, stop button 85 and line 86 to the power main 65. After the relay armature 90 closes and the start button 82 is released, the circuit remains completed but this time through interconnected contacts 91 and 92 of relay 90 and line 93, thereby by-passing the start button to line 84.

This will cause rotation of the shaft 19 and of the control cams 107, 108 and 109 which are keyed to that shaft. After the shaft 19 rotates through a predetermined angle, the lobe 110 on cam 108 passes out from under the end of switch 111, permitting the switch to close contacts 112 and 113, and establish a circuit from line 96, which is connected to power main 65, through line 114 to relay coil 115, the other end being connected through line 79 to power main 64. This causes actuation of the relay armature 77 interconnecting contact 75 with contact 116.

This closes a parallel circuit from starting coil 69 and line 73 to line 106. After this circuit has been established the lobe 117 on cam 107 opens the switch 100, thereby breaking the holding circuit from relay coil 78 which was created by the closing of contacts 102 and 103, whereby the relay armature 76 opens so that the control of the starting coil 69 is now transferred to the relay 115 under control of the switch 111. Since the holding circuit for coil 115 is through the stop button 85 by way of switch 111, line 96 and closed contacts 94, 95 this button may be depressed at any time to open the circuit to relay coil 115 and thereby open the circuit to the starting coil 69 to stop the indexing movement at will.

Since, at the same time, this will break the holding circuit to relay coil 89, contacts 94 and 95 will open, so that upon release of the stop button, the circuit to relay coil 115 will not be re-established. It thus becomes necessary to depress the start button in order to start the indexing again.

After the indexing mechanism has completed approximately 180 degrees of rotation the roller 20 is about to pass out of the groove 17 of the Geneva plate, and at this time, a lobe 118 on cam 109 closes the switch 119. This completes a circuit from the starting coil 69 through line 73, interconnected contacts 120–121 and line 122 to the power main 65.

The purpose of this circuit is to short out the stop button 85, rendering it ineffective to stop the motor, whereby the remainder of the cycle will be completed automatically to insure that the table is locked.

At the end of the cycle, the lobe 110 on cam 108 opens switch 111 and instantaneously thereafter the switch 119 passes off of lobe 118 to open contacts 120, 121.

The opening of switch 111, breaks the holding circuit to relay coil 115, opening contacts 75 and 116, thus transferring the control of the starting coil to switch 119 and when this switch opens, the starting switch opens also.

In order to quickly stop the motor a plugging relay 123, closes contacts 124, 125, completing a circuit from power main 65 through line 126, closed contacts 124, 125, line 127, and contacts 128, 129 which were closed when the starting switch opened, to the reverse switch actuating coil 130. This puts a surge of reversing current through the motor, but as soon as the motor stops, the plugging relay opens whereby the parts remain at rest.

There has thus been provided an improved indexing mechanism which is a complete unit having its own power operated means and control circuit therefor whereby the mechanism may be intermittently operated or allowed to execute a complete automatic cycle whereby the indexible part is moved from one station to the next and in which a locking mechanism has been provided which is adapted to position and lock the indexible part in such a manner that minimum wear of the parts will occur, thereby insuring lasting accuracy of the mechanism.

What is claimed is:

1. In an indexing mechanism for an indexible part of a machine tool, the combination of an indexible shaft for driving said part, means for locking said part, a second shaft for actuating said locking means, a drive shaft, a Geneva mechanism for transmitting motion from the drive shaft to the indexible shaft, a motion transmitting train connecting the drive shaft to said second shaft, a prime mover coupled to the drive shaft, and control means for starting and stopping said prime mover including means associated with the drive shaft for stopping the prime mover after the drive shaft has completed one revolution.

2. In an indexing mechanism for a movable part of a machine tool, the combination with means for effecting said indexing, of a locking assembly for said part including a bit carried by said part for movement therewith, an abutment member movable into the path of said bit, a locking member subsequently movable into position behind said bit, and means for causing said locking member to clamp the bit against said abutment member.

3. In an indexing mechanism for an indexible member of a machine, the combination with means for effecting said indexing, of means for locking said member after indexing including an abutment plunger for determining the station position of the indexible member, a locking plunger, a bit carried by the indexible member, and cam means for actuating said plungers in a predetermined sequence to lock the bit between the locking plunger and said abutment plunger.

4. In an indexing mechanism for the movable part of a machine tool, said part carrying a locating bit, the combination of means for engaging and clamping said bit to determine the station position of said part including an abutment plunger, a locking plunger, a common actuating means for said plungers including means normally maintaining one of said plungers in advance of the other during movement to locking position, a positive stop for the locating plunger, and resilient connections whereby said locking plunger is moved into clamping position after the locating plunger has stopped.

5. In a mechanism for indexing the movable part of a machine, the combination of a drive shaft, a Geneva mechanism actuable by the drive shaft for indexing said part, means for locking said part against movement, an electrical prime mover coupled to the drive shaft, an electrical control circuit for said prime mover, said drive shaft being operable during one revolution to sequentially effect unfastening of said locking means, indexing of the part, and fastening of the locking means in the order named, and switch means in said circuit actuable by the drive shaft for stopping the prime mover after the shaft has made one revolution.

6. In a mechanism for indexing a movable part of a machine, the combination of a Geneva plate coupled to said part, a drive shaft, a roller carried by the drive shaft for engaging said plate, a motor permanently connected for actuation of the shaft, a control circuit for the motor, means in said circuit for stopping the motor at will during engagement of the roller with said plate, and additional means in said circuit operable by the shaft when the roller passes out of engagement with the plate to render said stop means ineffective until the shaft has completed a revolution.

7. In an indexing mechanism for an indexible part of a machine, the combination of a branch transmission for effecting the indexing of the part, a second branch transmission for actuating a locking mechanism for the part, a common drive shaft for said transmissions, a motor for rotating said shaft, a solenoid actuated starter switch for said motor, a control circuit for the solenoid of said switch including a plurality of relays, manual switches for controlling said relays to effect starting and stopping of said motor at will, a trip operable switch and cam means carried by said shaft for closing said switch after the indexing has been completed to short circuit said relays and render said manually operated switches ineffective until the second branch transmission has completed the locking of the indexible part.

8. In an indexing mechanism for a movable part of a machine, the combination with means for effecting index movements of said part, of means for locking said part including a series of radially extending bits integral with said part, a station determining plunger and a locking plunger, and means to shift said plungers after each indexing movement to effect clamping of one of said bits between said plungers to locate and hold the movable part in indexed position.

9. In an indexing mechanism for a movable part of a machine tool, said part carrying a series of integral locating bits, the combination of means for locking said part including a pair of plungers, cam operated means for sequentially shifting said plungers, the first of which is moved into the path of one of said bits and the other behind said bit, and means for causing the last-named plunger to clamp the bit against the first-named plunger.

10. In an indexing mechanism for the movable part of a machine tool, said part carrying a locating bit, the combination of means for engaging and clamping said bit including a pair of plungers, a common actuator for shifting said plungers into position on opposite sides of said bit, means for causing one of said plungers to lock said bit against the other plunger and resilient means compressible by said actuator for applying and holding pressure on said plungers after locking has been completed.

AMOS H. HAWLEY, Sr.
WINTHROP TRIBLE.